(12) United States Patent
Fischer et al.

(10) Patent No.: US 8,448,965 B2
(45) Date of Patent: May 28, 2013

(54) TRANSVERSE LINK FOR A WHEEL SUSPENSION

(75) Inventors: Raphael Fischer, Herzogenaurach (DE); Vincent Cardinet, Boulogne (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/121,831

(22) PCT Filed: Nov. 19, 2009

(86) PCT No.: PCT/EP2009/065493
§ 371 (c)(1),
(2), (4) Date: Apr. 21, 2011

(87) PCT Pub. No.: WO2010/069702
PCT Pub. Date: Jun. 24, 2010

(65) Prior Publication Data
US 2011/0233888 A1    Sep. 29, 2011

(30) Foreign Application Priority Data
Dec. 18, 2008 (DE) .......................... 10 2008 063 603

(51) Int. Cl.
*B60G 3/04* (2006.01)
(52) U.S. Cl.
USPC ................................................. 280/124.134
(58) Field of Classification Search
USPC ..................... 280/124.134, 124.135, 124.136, 280/124.116, 124.117
See application file for complete search history.

(56) References Cited

U.S. PATENT DOCUMENTS

| 3,161,419 A | 12/1964 | Schaaf |
| 3,680,881 A | 8/1972 | Douglas |
| 5,026,090 A | 6/1991 | Sekino |
| 5,451,073 A * | 9/1995 | Inoue ..................... 280/124.145 |
| 7,878,511 B2 * | 2/2011 | Haeusler et al. ............. 280/5.52 |

FOREIGN PATENT DOCUMENTS

| DE | 38 23 600 A1 | 1/1989 |
| DE | 39 06 501 A1 | 9/1989 |
| EP | 0 506 141 A1 | 9/1992 |
| EP | 1 977 915 A1 | 10/2008 |
| FR | 2 395 853 A1 | 1/1979 |
| FR | 2 839 280 A1 | 11/2003 |

* cited by examiner

*Primary Examiner* — Faye M. Fleming
(74) *Attorney, Agent, or Firm* — Lucas & Mercanti, LLP

(57) ABSTRACT

A transverse link for a wheel suspension, which can be connected to a suspension point of a car body or of a chassis and a holding point of a wheel mount. The transverse link has a connecting rod on the wheel mount side and a connecting rod on the vehicle side, which are connected to one another in a rotating manner. The connecting rod on the vehicle side can be fastened on the suspension point of the auto body or of the chassis and the connecting rod on the wheel mount side can be fastened to the holding point of the wheel mount. Such a transverse link can be used both on the front and rear axles. The plurality of variable parameters permits fine coordination with regard to kinematic travel properties. Also, a low number of additional components are required.

10 Claims, 4 Drawing Sheets

TRANSVERSE LINK FOR A WHEEL SUSPENSION

This application is a 371 of PCT/EP2009/065493 filed Nov. 19, 2009, which in turn claims the priority of DE 10 2008 063 603.7 filed Dec. 18, 2008, the priority of both applications is hereby claimed and both applications are incorporated by reference herein.

FIELD OF THE INVENTION

The invention relates to a transverse link for a wheel suspension, the transverse link being connectable to a suspension point of a body or of a chassis and to a holding point of a wheel carrier.

BACKGROUND OF THE INVENTION

A wheel carrier of said type is used in virtually all motor vehicles, such as for example passenger motor vehicles and utility motor vehicles, and is provided to absorb vertical movements of a wheel and to enable the latter to be steered at all times. For this purpose, transverse links are rotatably connected at the wheel carrier side to the wheel carrier, and at the vehicle side, said transverse links often have two rotatable connections to the body or to the chassis. Transverse links therefore usually form an L-shape or Y-shape, whereby they can enduringly stabilize the wheel under loading in or counter to the direction of travel.

Typically, in modern vehicles, use is made of axle arrangements based on double transverse links or multi-link axles. Said systems offer good possibilities for running gear set-up adjustment, in particular with regard to the wheel camber and wheel toe behavior during the movement of the wheel under spring compression.

A disadvantage of said designs is the spatial requirement of the upper link plane. At this location between the wheel and body, the interior space of the vehicle is considerably restricted. This applies both to the front axle (engine bay) and also to the rear axle (luggage compartment). A lateral reduction in size must however be accepted for the benefit of improved driving characteristics.

It is also conceivable to use a rigid axle or a twist beam rear axle, which are economically expedient but offer only few possibilities for set-up adjustment with regard to driving dynamics. On account of the low flexibility, the use of said alternatives is disregarded for higher-grade vehicles.

It is a problem that, in the case of a transverse link approach, the upper transverse link must be reduced in length in order to provide more space. This has an adverse effect on driving characteristics. It is basically the case that the longest transverse links possible are advantageous for optimum driving characteristics, since the axis of rotation during spring compression is situated a very great distance into the vehicle. This has the result, for example, of only a small change in wheel camber angle during spring compression and rebound. Relatively short transverse links have an extremely detrimental effect on the wheel camber behavior.

In the past, it has been sought to obtain advantageous driving dynamics with the shortest possible transverse links by using stabilizing devices, wherein the mentioned loss of space was accepted.

DE 10 2006 061 975 A1 discloses a wheel suspension which comprises a two-part wheel carrier which bears a vehicle wheel, one part of the wheel carrier being attached to a stabilizer with a compensating means.

SUMMARY OF THE INVENTION

The invention is based on the object of specifying a transverse link which provides more space at the vehicle side but also permits good driving dynamics.

Said object is achieved by means of a transverse link of the type mentioned in the introduction in that the transverse link has at least one vehicle-side link, which can be fastened to the suspension point, and a wheel-carrier-side link which can be fastened to a holding point of the wheel carrier, the vehicle-side link and the wheel-carrier-side link being rotationally connected to one another. The object is also achieved by means of a wheel suspension which has such a transverse link.

According to the invention, the transverse link has a vehicle-side link and a wheel-carrier-side link which are rotationally connected to one another. The transverse link should therefore no longer be regarded as a rigid transverse link, but rather can shorten or lengthen, as required, the spacing from its holding point on the wheel carrier to the suspension point on the body or of the chassis during a spring compression. It is therefore possible for the wheel camber angle to be positively influenced in terms of stabilization depending on the magnitude of spring compression.

In other words, it is made possible, with a relatively short transverse link which is highly beneficial for the size of the usable volume in the vehicle, to simulate a long transverse link which in turn has very good driving dynamics qualities. With this technique, it is possible to shorten preferably an upper transverse link, but also a lower transverse link, without having to accept any disadvantages in terms of driving dynamics. It has hitherto been primarily the length of the upper transverse link that has proven to be problematic, but it is now possible to provide more space in the vicinity of the lower transverse link too.

In one advantageous embodiment, the vehicle-side link has a coupling element which is provided for connecting to at least one other part of the wheel suspension, in particular to another transverse link, to the wheel-carrier-side holding point thereof, or to the wheel carrier. In this way, a passive regulating mechanism is produced which connects the transverse link, by means of the vehicle-side link thereof, to a part of the wheel suspension in such a way that a corrective introduction of force into the vehicle-side link can be derived from said part. The wheel suspension therefore has a self-correcting action with regard to its wheel camber behavior or the change in track width. If a spring compression process now occurs, firstly the part of the wheel suspension, for example another transverse link, the wheel-carrier-side holding point thereof or the wheel carrier itself, is moved. Said movement generates a force flow via the coupling element, which in turn acts on the vehicle-side link and adapts the radius of rotation of the transverse link in such a way that the wheel camber angle remains as small as possible or the driving characteristics are positively influenced in some other way.

In one advantageous embodiment, the coupling element is rotationally or slidingly connected to the vehicle-side link. In this way, it is possible for the vehicle-side link to be oriented differently within the wheel suspension, thereby providing a further option for space apportionment, which may have an advantageous effect in individual situations. For example, in this context, a sliding connection is more space-saving than a rotational connection, but the rotational connection is possibly less susceptible to infiltrating dirt particles.

In one advantageous embodiment, the sliding connection of the coupling element to the vehicle-side link is arranged between the suspension point thereof and the rotational connection to the wheel-carrier-side link. In this embodiment, the coupling element may be fastened to the wheel carrier so as to form a small angle with the vehicle-side link, thereby permitting a low-friction sliding connection. The magnitude of the correction may be defined by the length of the sliding surface of the sliding connection. The sliding connection enables the transverse link to buckle, but also limits the angle enclosed between the vehicle-side link and the wheel-carrier-side link. The limitation of the angle is advantageously realized by means of the spring strut or rubber stops of the links or of the wheel carrier with respect to the body.

In one advantageous embodiment, the suspension point is arranged in the force transmission chain between the rotational connection of the coupling element to the vehicle-side link and a rotational connection of the vehicle-side link to the wheel-hearing-side link. The force transmission chain is the path of a force used by the wheel suspension to carry out a correction of the wheel position. Firstly, said force is transmitted from a part of the wheel suspension to the coupling element, which conducts the force onward to the vehicle-side link. The vehicle-side link, by means of its own movement, effects a change in the radius of rotation of the transverse link by utilizing the force so as to act in a corrective manner via the wheel-carrier-side link on the holding point thereof or on the wheel carrier.

The vehicle-side link is advantageously provided for rotationally connecting to two suspension points of the body or of the chassis. Said measure stabilizes the wheel suspension with respect to forces acting on the vehicle in the direction of travel or counter to the direction of travel. The use of the transverse link according to the invention does not rule out the possibility of two suspension points being provided, because the axis of rotation of said suspension points lies substantially in the direction of travel, whereby the spring compression process is optimally assisted.

In one advantageous embodiment of a wheel suspension, the latter has at least one first transverse link according to the invention.

In one advantageous embodiment, the coupling element of the first transverse link has a rotational connection in the vicinity of the holding point of a second transverse link, or the rotational connection of the coupling element of the first transverse link is arranged on an axis with the holding point of the second transverse link. In modern wheel suspensions, multi-link arrangements are the order of the day, in which more than two transverse links are used for the suspension of a wheel. It is therefore conceivable for example for transverse link pairs to be formed, with one transverse link of such a pair being designed in the manner according to the invention, and the associated conventional transverse link or the holding point thereof on the wheel carrier being connected, for the purpose of force transmission, to the coupling element.

It is therefore advantageous, for example, for the coupling element of the first transverse link to be rotatably fastened to a second transverse link, in the same way as it is advantageous for the coupling element of the first transverse link to be rotatably fastened to the wheel carrier. Here, it makes no difference whether, in relation to the roadway, the first transverse link is an upper transverse link or a lower transverse link. The use of the transverse link according to the invention as an upper or lower transverse link is dependent on where it is sought to save space in the chassis.

BRIEF DESCRIPTION OF THE DRAWINGS

Further advantageous embodiments and preferred refinements of the invention will emerge from the description of the figures and/or from the subclaims.

The invention will be described and explained in more detail below on the basis of the exemplary embodiments illustrated in the figures, in which.

DETAILED DESCRIPTION OF THE INVENTION

Figure 1:
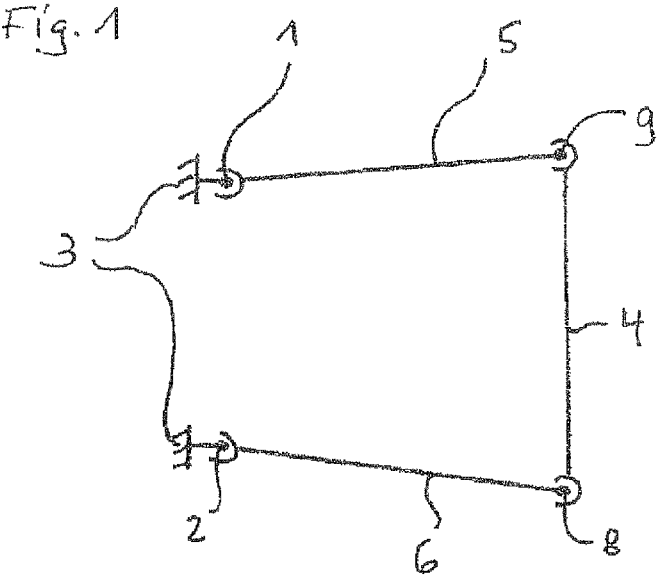
FIG. 1 shows a schematic illustration of a wheel suspension having an upper and a lower transverse link according to the prior art.

FIG. 1 shows a schematic illustration of a wheel suspension having an upper transverse link 5 and a lower transverse link 6 according to the prior art.

The chassis 3 has an upper suspension point 1 and a lower suspension point 2 which are provided in each case for the upper transverse link 5 and the lower transverse link 6. Here, the distance between the two suspension points 1, 2 is smaller than the distance between the holding points 8, 9 of the wheel carrier 4. It is thereby possible to generate a center of rotation for the wheel carrier 4.

The transverse links 5, 6 shown are of equal length. It is however also possible for in particular the upper transverse link to be designed to be shorter than the lower transverse link. Specifically, in this case, the wheel camber angle and change in track width can be coordinated with the wheel lift. This is based on the fact that the holding point 9 can move in a smaller circle about the suspension point 1 than the holding point 8 about the suspension point 2.

Figure 2:
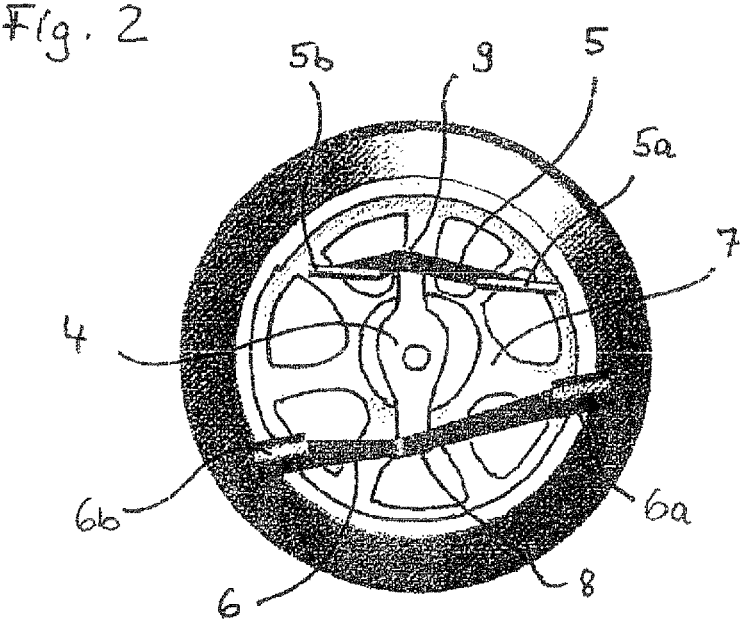
FIG. 2 shows an illustration of a wheel suspension according to the prior art viewed from the vehicle in the direction of the wheel.

FIG. 2 shows an illustration of a wheel suspension according to the prior art as viewed from the vehicle in the direction of the wheel. In addition to the wheel rim 7 and the wheel carrier 4, the transverse links 5, 6 are also depicted in realistic form.

The upper transverse link 5 and the lower transverse link 6 are rotationally connected in each case to the upper holding point 9 and also to the lower holding point 8 of the wheel carrier 4. Furthermore, the two transverse links 5, 6 have a Y-shape such that, at the vehicle side, there are a total of four suspension points (2 per transverse link). In each case two of said suspension points (not shown) can be connected to the connecting pieces 5a, 5b of the upper transverse link 5 and to the connecting pieces 6a, 6d of the lower transverse link 6, since the in each case 2 suspension points lie on an axis of rotation.

Figure 3:
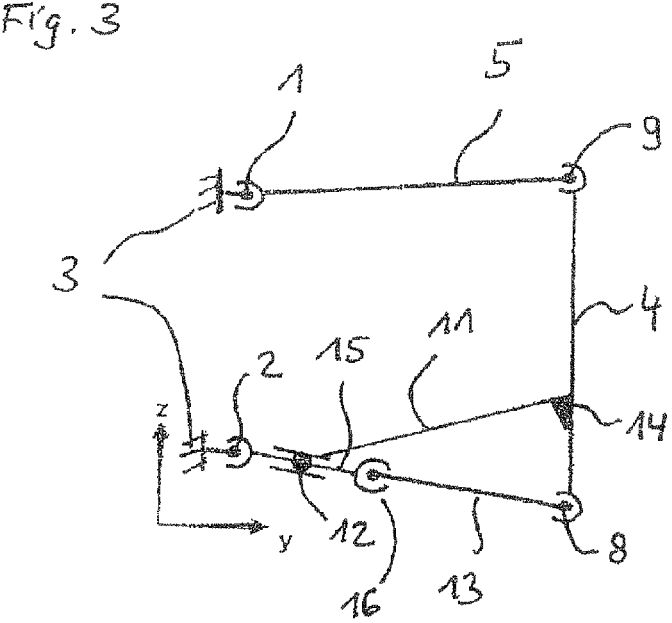
FIG. 3 shows a schematic illustration of a first exemplary embodiment of a wheel suspension having a multi-part lower transverse link.

FIG. 3 shows a schematic illustration of a first exemplary embodiment of a wheel suspension having a multi-part, lower transverse link. The multi-part lower transverse link is composed of a wheel-carrier-side link 13, a vehicle-side link 15, a sliding piece 12 and a coupling element 11.

The shortening of the upper transverse link is now realized in that a rotational connection 16 is arranged between the vehicle-side link 15 and the wheel-side link 13. It is thereby advantageously possible to shorten the spacing from the suspension point 1 to the holding point 9 if this is required during the spring compression process.

By means of the coupling element 11, which is fastened by means of a rigid connection 14 to the wheel carrier 4 and is rotationally fastened to the sliding piece 12, a force is then exerted on the sliding piece 12 and the vehicle-side link 15 when the wheel carrier 4 is deflected during spring compression and rebound.

As a result of the spring compression, the wheel camber and track width are adjusted. During a vertical movement of the wheel carrier 4, the links 13, 15 are buckled, with the length of the transverse link being changed. As a result, the holding point 8 travels horizontally and, in conjunction with the position of the holding point 9, adjusts the wheel camber and the track width.

For reference, and also representatively for the following schematically illustrated figures, the vertical is illustrated as the z direction and the horizontal is illustrated as the y direction.

Figure 4:
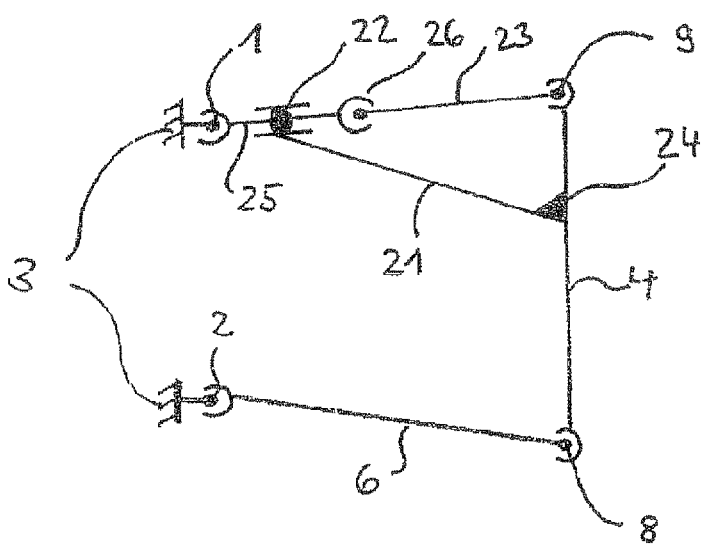
FIG. 4 shows a schematic illustration of a second exemplary embodiment of a wheel suspension having a multi-part upper transverse link.

FIG. 4 shows a schematic illustration of a second exemplary embodiment of a wheel suspension having a multi-part upper transverse link.

The upper transverse link is composed of a coupling element 21 which is attached by means of the rigid connection 24 to the wheel carrier 4, is simultaneously rotationally attached to a sliding piece 22, and acts in a corresponding way to the coupling element 11 of FIG. 3. However, the vehicle-side link 25 is attached to the upper holding point 1 and is connected by means of a rotational connection 26 to the wheel-carrier-side link 23, which in turn is rotationally connected to the holding point 9 of the wheel carrier 4.

In contrast to the first exemplary embodiment, the effective length of the upper transverse link is, as a result of its multi-part nature, made variable as a function of the wheel carrier position, such that a shortening of the upper transverse link is possible during spring compression.

It is advantageously possible to resort to conventional components for the realization of the multi-part transverse link. A complex design such as is the case for example with linear guides is not necessary. Furthermore, the flexibility of the wheel bearing arrangement is increased because a multiplicity of parameters is made more variable, and fine set-up adjustment is made possible.

Figure 5:
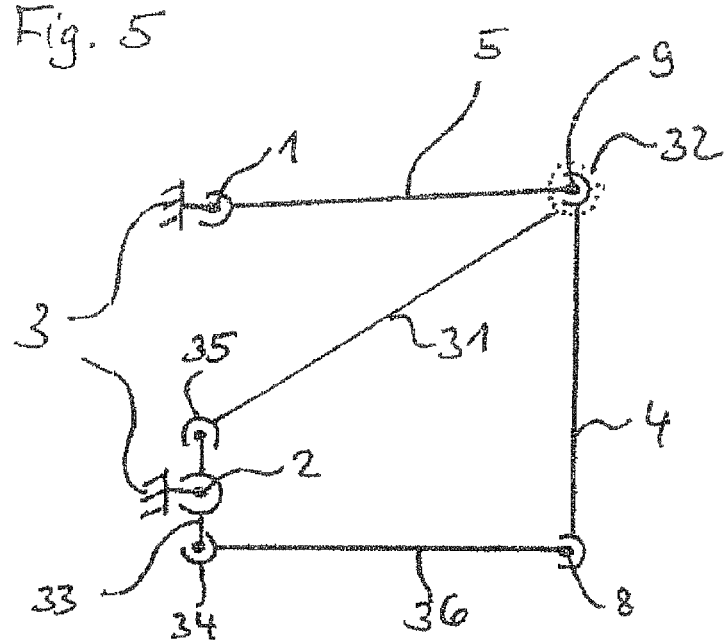
FIG. 5 shows a schematic illustration of a third exemplary embodiment of a wheel suspension having a multi-part lower transverse link.

FIG. 5 shows a schematic illustration of a third exemplary embodiment of a wheel suspension having a multi-part lower transverse link.

The lower transverse link of the third exemplary embodiment is composed of a coupling element 31, a wheel-carrier-side link 36 and a vehicle-side link 33 which is designed as a rocker, said parts of the lower transverse link being kinematically connected to one another by means of the rotational connections 35 and 34. The rocker-like nature of the vehicle-side link 33 arises from the fact that it is arranged, as viewed schematically, between the two rotational connections 34, 35. It is notable here that, in the mechanical embodiment of the vehicle-side link 33, the rotational connections 34 and 35 may by all means be situated closer than they are remote from the holding point 2. This is based on the fact that the vehicle-side link 33 may extend along or counter to the direction of travel.

The kinematic force transmission chain begins, in the event of a movement of the wheel under spring compression, at the rotational connection 32 of the coupling element 31 to the holding point 9 of the wheel carrier 4. The force is transmitted from the coupling element 31 to the rocker 33, which then displaces the wheel-carrier-side link 34 in such a way (to the right in FIG. 5) that the holding point 8 is situated horizontally at the desired position. It is therefore likewise possible for the wheel camber and the change in track width to be controlled in a similar way to that in the preceding exemplary embodiments.

Installation space is created in the vicinity of the suspension point 1. Furthermore, fine set-up adjustment of the wheel suspension can be realized if, inter alia, the following parameters are fixed:

A) Spacings of the suspension points 1 and 2 in the horizontal (y) and vertical (z) direction.
B) Spacing of the rotational connections 34 and 35.
C) Angle of the rocker 33 to the vertical (z direction).
D) Length of the upper transverse link 5.
E) Angle between the horizontal (y direction) and the upper transverse link 5.
F) Spacing of the holding points 8, 9 of the wheel carrier 4.
G) Spacing of the suspension point 2 to the rotational connection 34.

It is expedient for the stated parameters to be fixed in a manner oriented to the kinematic behavior of a double transverse link, and for the parameters to be fixed correspondingly. The kinematic behavior of the wheel suspension of the third exemplary embodiment is therefore similar to that of a double-transverse-link suspension arrangement, but provides more installation space, in this exemplary embodiment, in the vicinity of the suspension point 1, that is to say for example in the engine bay or luggage compartment of the motor vehicle.

Figure 6:
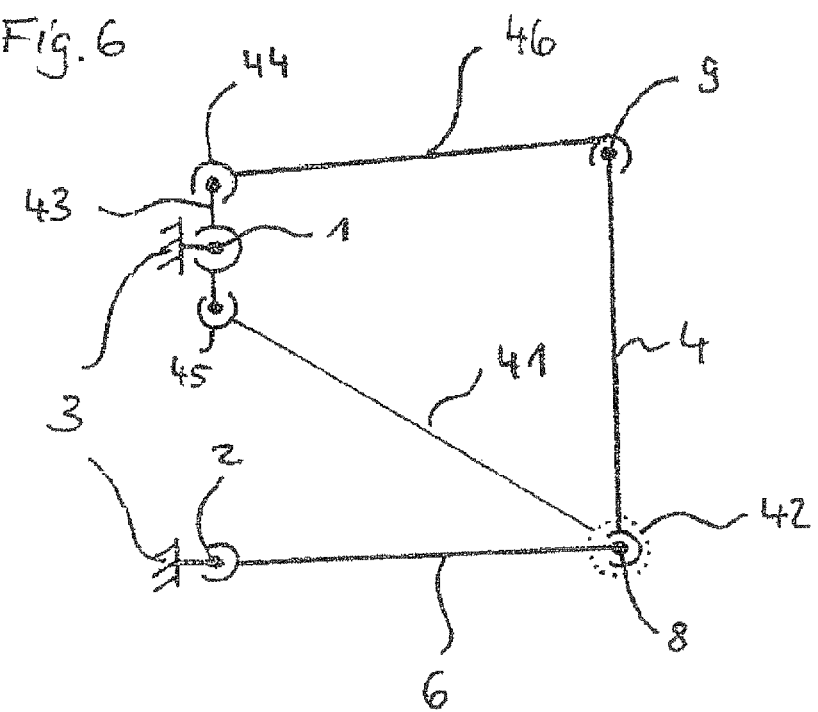
FIG. 6 shows a schematic illustration of a fourth exemplary embodiment of a wheel suspension having a multi-part upper transverse link.

FIG. 6 shows a schematic illustration of a fourth exemplary embodiment of a wheel suspension having a multi-part upper transverse link.

The upper transverse link is composed of a coupling element 41, a vehicle-side link 43 and a wheel-carrier-side link 46 which are connected to one another by means of the rotational connections 45 and 44. The vehicle-side link 43 is rotationally mounted on the suspension point 1 and likewise has a rocker function, like the vehicle-side link 33 from the third exemplary embodiment.

The mode of operation of said multi-part transverse link which is designed as an upper transverse link kinematically corresponds to that of the transverse link from the third exemplary embodiment. The explanations relating to the third exemplary embodiment apply correspondingly. However, in the fourth exemplary embodiment, additional installation space is provided in the vicinity of the suspension point 2.

Figure 7:
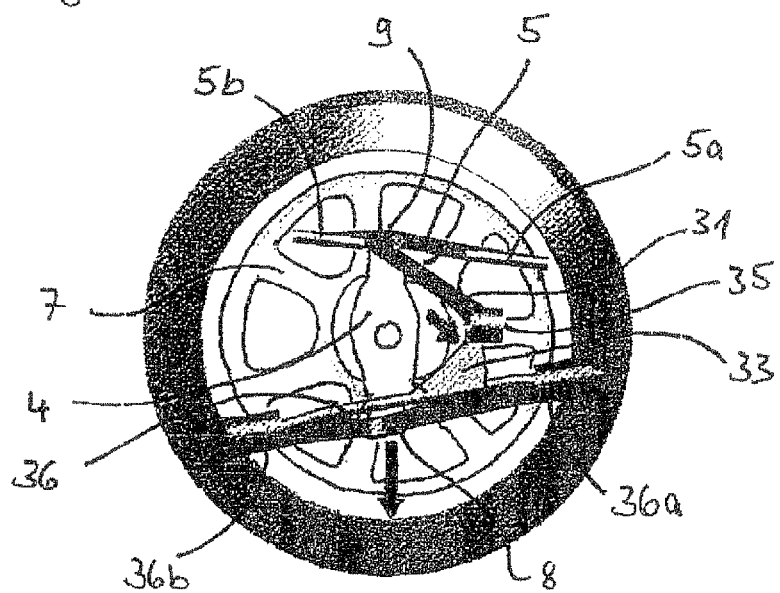
FIG. 7 shows an illustration of the third exemplary embodiment from FIG. 5 as viewed from the chassis in the direction of the wheel.

FIG. 7 shows an illustration of the third exemplary embodiment from FIG. 5 as viewed from the chassis in the direction of the wheel.

As in the third exemplary embodiment, the lower transverse link is of multi-part design, with the corresponding parts also being labeled as they are in FIG. 5. The statements made relating to FIG. 5 apply correspondingly.

The effect of a deflection of the upper holding point 9 in the downward direction on the wheel suspension is shown by means of the arrows. Here, reference is made to the kinematic descriptions with regard to FIG. 5.

The lower transverse link 6 has a Y-shape, that is to say is connected by means of two connecting pieces 36a and 36b to the wheel-carrier-side link (rocker), that is to say is of broader design than is suggested by the wheel-carrier-side link 36 of FIG. 5.

Despite its standard design, the upper transverse link 5 is effectively shortened.

Figure 8:
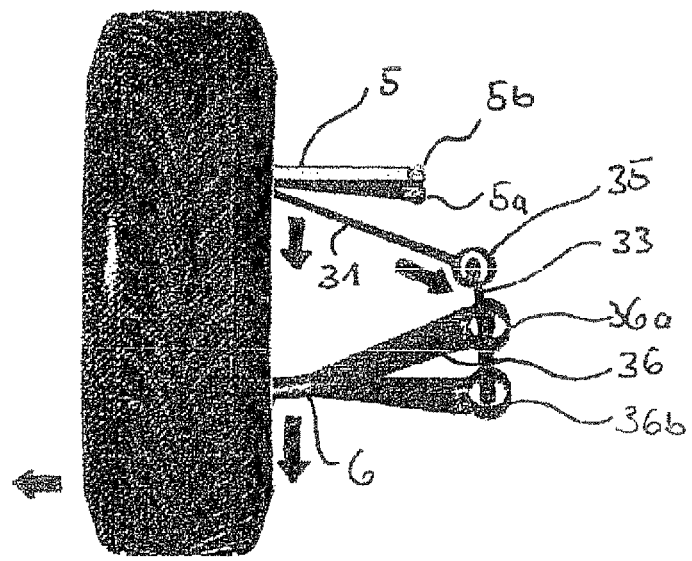
FIG. 8 shows an illustration of the third exemplary embodiment from FIG. 5 viewed along the direction of travel.

FIG. 8 shows an illustration of the third exemplary embodiment from FIG. 5 viewed along the direction of travel. The arrows illustrate the kinematic situation as indicated in FIG. 7.

A movement of the illustrated wheel in the downward direction leads, in FIG. 8, to a horizontal movement of the lower part of the tire to the left.

In summary, the invention relates to a transverse link for a wheel suspension, the transverse link being connectable to a suspension point of a body or of a chassis and to a holding point of a wheel carrier. It is sought to provide more installation space in the vehicle without dispensing with the positive kinematic properties of a double transverse link. For this purpose, a transverse link is proposed which has a wheel-carrier-side link and a vehicle-side link which are rotationally connected to one another. The vehicle-side link can be fastened to the suspension point of the body or of the chassis, and the wheel-carrier-side link can be fastened to the holding point of the wheel carrier. A transverse link of said type may advantageously be used both on front and rear axles, wherein the multiplicity of variable parameters permits fine set-up adjustment with regard to the kinematic driving characteristics. The low number of additional components is also advantageous.

LIST OF REFERENCE SYMBOLS

1 Upper Suspension Point
2 Lower Suspension Point
3 Chassis
4 Wheel Carrier
5 Upper Transverse Link
5a Connecting Piece
5b Connecting Piece
6 Lower Transverse Link
6a Connecting Piece
6b Connecting Piece
7 Wheel Rim
8 Lower Holding Point
9 Upper Holding Point
11 Coupling Element
12 Sliding Piece
13 Wheel-Carrier-Side Link
14 Rigid Connection
15 Vehicle-Side Link
16 Rotational Connection
21 Coupling Element
22 Sliding Piece
23 Wheel-Carrier-Side Link
24 Rigid Connection
25 Vehicle-Side Link
26 Rotational Connection
31 Coupling Element
32 Rotational Connection
33 Vehicle-Side Link
34 Rotational Connection
35 Rotational Connection
36 Wheel-Carrier-Side Link
36a Connecting Piece
36b Connecting Piece
41 Coupling Element
42 Rotational Connection
43 Vehicle-Side Link
44 Rotational Connection
45 Rotational Connection
46 Wheel-Carrier-Side Link

The invention claimed is:

1. A transverse link for a wheel suspension, which is connectable to a suspension point of a body or of a chassis and to a holding point of a wheel carrier, comprising:
   at least one vehicle-side link which is fastenable to the suspension point;
   a wheel-carrier-side link, which is fastenable to the holding point of the wheel carrier, the vehicle-side link and the wheel-carrier-side link being rotationally connected to one another; and
   a coupling element that connects to at least one other part of the wheel suspension, the coupling element being connected to the vehicle-side link by a sliding connection so that the coupling element slides relative to the vehicle-side link.

2. The transverse link as claimed in claim 1, wherein the coupling element connects to another transverse link, the wheel-carrier-side holding point, or the wheel carrier.

3. The transverse link as claimed in claim 1, wherein the sliding connection of the coupling element to the vehicle-side link is arranged between the suspension point thereof and the rotational connection of the vehicle-side link to the wheel-carrier-side link.

4. The transverse link as claimed in claim 1, wherein the vehicle-side link rotationally connects to two suspension points of the body or of the chassis.

5. A wheel suspension having at least one first transverse link for a wheel suspension, which is connectable to a suspension point of a body or of a chassis and to a holding point of a wheel carrier, comprising at least one vehicle-side link, which is fastenable to the suspension point; a wheel-carrier-side link, which is fastenable to the holding point of the wheel carrier, the vehicle-side link and the wheel-carrier-side link being rotationally connected to one another; and a coupling element that connects to at least one other part of the wheel suspension, the coupling element being connected to the vehicle-side link by a sliding connection so that the coupling element slides relative to the vehicle-side link.

6. The wheel suspension as claimed in claim 5, further comprising a second transverse link, and the coupling element of the first transverse link having a rotational connection to the holding point of the second transverse link via the wheel carrier.

7. The wheel suspension as claimed in claim 5, wherein the coupling element of the first transverse link is fastened by a rigid connection to the wheel carrier.

8. The wheel suspension as claimed in claim 5, wherein the first transverse link is an upper transverse link.

9. The wheel suspension as claimed in claim 5, wherein the first transverse link is a lower transverse link.

10. The transverse link as claimed in claim 1, wherein the coupling element of the first transverse link is fastened by a rigid connection to the wheel carrier.

* * * * *